United States Patent
Soloveichik et al.

(10) Patent No.: US 8,647,413 B2
(45) Date of Patent: Feb. 11, 2014

(54) SPRAY PROCESS FOR THE RECOVERY OF $CO_2$ FROM A GAS STREAM AND A RELATED APPARATUS

(75) Inventors: Grigorii Lev Soloveichik, Latham, NY (US); Robert James Perry, Niskayuna, NY (US); Benjamin Rue Wood, Niskayuna, NY (US); Sarah Elizabeth Genovese, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 960 days.

(21) Appl. No.: 12/609,454

(22) Filed: Oct. 30, 2009

(65) Prior Publication Data

US 2011/0100217 A1    May 5, 2011

(51) Int. Cl.
| | |
|---|---|
| *B01D 53/14* | (2006.01) |
| *B01D 47/00* | (2006.01) |
| *B01D 19/00* | (2006.01) |
| *B01D 53/56* | (2006.01) |
| *C01B 31/20* | (2006.01) |

(52) U.S. Cl.
USPC ............... 95/205; 95/149; 95/156; 95/178; 95/236; 423/220; 423/437.1

(58) Field of Classification Search
None
See application file for complete search history.

(56) References Cited

U.S. PATENT DOCUMENTS

| | | | |
|---|---|---|---|
| 4,406,867 A * | 9/1983 | Marcinkowsky et al. | .... 423/226 |
| 5,279,646 A | 1/1994 | Schwab | |
| 7,368,602 B2 | 5/2008 | Sakai et al. | |
| 8,016,919 B2 * | 9/2011 | Iijima et al. | ...................... 95/178 |
| 2006/0117954 A1 | 6/2006 | Versteeg et al. | |
| 2008/0159937 A1 | 7/2008 | Ouimet | |
| 2009/0202410 A1 | 8/2009 | Kawatra et al. | |
| 2009/0220397 A1 | 9/2009 | Heldebrant et al. | |
| 2010/0092359 A1 * | 4/2010 | Svendsen et al. | ............. 423/230 |
| 2010/0170397 A1 * | 7/2010 | Padban | ............................ 95/183 |
| 2010/0186591 A1 * | 7/2010 | Skovholt et al. | ................. 95/183 |
| 2010/0263534 A1 * | 10/2010 | Chuang | ............................ 95/139 |
| 2011/0064636 A1 * | 3/2011 | Petig et al. | ..................... 423/234 |
| 2012/0027663 A1 * | 2/2012 | Pinard Westendorf et al. | ............................... 423/437.1 |

FOREIGN PATENT DOCUMENTS

| | | |
|---|---|---|
| EP | 0588175 | 8/1997 |
| EP | 0588178 | 1/1998 |
| EP | 0776687 | 11/2007 |
| FR | 2909010 A1 | 5/2008 |
| JP | 2003261315 | 9/2003 |

(Continued)

OTHER PUBLICATIONS

PCT/US2010/037691 Search Report, Jul. 29, 2010.

(Continued)

*Primary Examiner* — Duane Smith
*Assistant Examiner* — Pankti Patel
(74) *Attorney, Agent, or Firm* — Robert M. McCarthy

(57) ABSTRACT

A method for recovering carbon dioxide ($CO_2$) from a gas stream is disclosed. The method includes the step of reacting $CO_2$ in the gas stream with fine droplets of a liquid absorbent, so as to form a solid material in which the $CO_2$ is bound. The solid material is then transported to a desorption site, where it is heated, to release substantially pure $CO_2$ gas. The $CO_2$ gas can then be collected and used or transported in any desired way. A related apparatus for recovering carbon dioxide ($CO_2$) from a gas stream is also described herein.

27 Claims, 2 Drawing Sheets

(56) References Cited

FOREIGN PATENT DOCUMENTS

| WO | 03095071 | 11/2003 |
|---|---|---|
| WO | 2007144372 | 12/2007 |
| WO | 2008072979 | 6/2008 |
| WO | 2008086812 | 7/2008 |

OTHER PUBLICATIONS

R. Hart et al., "Benign coupling of reactions and separations with reversible ionic liquids," Elsevier, Tetrahedron, vol. 66, 2010, pp. 1082,1090.

D.J. Heldebrant et al., "CO2-binding organic liquids (CO2BOLs) for post-combustion CO2 capture," Science Direct, Elsevier, Energy Procedia 1,2009, pp. 1187-1195.

PCT/US2010/037691 Written Opinion, Jul. 29, 2010.

FR2909010 Abstract, May 20, 2008.

JP2003261315 Abstract, Sep. 16, 2003.

Robert James Perry et al., Carbon Dioxide Absorbent & Method of Using the Same, U.S. Appl. No. 12/512,105, filed Jul. 30, 2009.

"Remediation Technology Healty and Safety Hazards: Thermal Desorption," circulated by the Occupational Safety & Health Administration (OSHA); SHIB Feb. 3, 2003. http://www.osha.gov/dts/shib/shib_02_03_03_tsds9.pdf.

Kitchens et al., "Reversible Gelation of Polyethyleneimide Solutions Using CO2," AIChE Annual Meeting, 2006, p. 520f.

Yamada et al., "Reversible, Room-Temperature Chiral Ionic Liquids. Amidinium Carbamates Derived From Amidines and Aliphatic Primary Amines with Carbon Dioxide," Chemistry of Materials, vol. 19, No. 5, 2007,pp. 4761-4768.

WO2007144372 Abstract, Dec. 21, 2007.

\* cited by examiner

SPRAY PROCESS FOR THE RECOVERY OF $CO_2$ FROM A GAS STREAM AND A RELATED APPARATUS

STATEMENT REGARDING FEDERALLY SPONSORED RESEARCH & DEVELOPMENT

This invention was made with Government support under contract number NETL DE-NT0005310, awarded by the Department of Energy. The Government has certain rights in the invention.

BACKGROUND

This invention generally relates to processes for capturing carbon dioxide ($CO_2$) from gas streams which contain a mixture of constituents.

The emission of carbon dioxide into the atmosphere from industrial sources such as power plants is now considered to be a principal cause of the "greenhouse effect", which contributes to global warming. In response, tremendous efforts are underway to reduce emissions of $CO_2$. Many different processes have been developed to attempt to accomplish this task. Examples include polymer and inorganic membrane permeation; removal of $CO_2$ by adsorbents such as molecular sieves; cryogenic separation; and scrubbing with a solvent that is chemically reactive with $CO_2$, or which has a physical affinity for the gas.

One technique has received much attention for removing $CO_2$ from flue gas streams, e.g., exhaust gas produced at power plants. In this technique, aqueous monoethanolamine (MEA) or hindered amines like methyldiethanolamine (MDEA) and 2-amino-2-methyl-1-propanol (AMP) are employed as the solvents in an absorption/stripping type of regenerative process. The technique has been used commercially for $CO_2$ capture from coal fired power plants and gas turbines.

There are certainly considerable advantages inherent in the MEA and hindered amine-based absorption processes. However, a number of deficiencies may be preventing wider adoption of this type of technology. For example, the process can sometimes result in sharp increases in the viscosity of the liquid absorbent, which can cause clogging of pipelines. To avoid this problem, the concentration of MEA and other amines is sometimes maintained at a relatively low level, e.g., below about 30 wt. % in the case of MEA. However, the lower concentrations can greatly reduce absorbing capacity, as compared to the theoretical capacity of the neat absorbent.

Moreover, energy consumption in the MEA process can be quite high, due in large part to the need for solvent (e.g., water) heating and evaporation. For example, the process may consume about 10-30% of the steam generated in a boiler that is heated by combustion of a fossil fuel. Furthermore, MEA-based absorption systems may not have the long-term thermal stability, in the presence of oxygen, in environments where regeneration temperatures typically reach at least about 120° C.

Additional drawbacks may result from the fact that the liquid absorbent which is enriched with $CO_2$ in the MEA or hindered amine process may still contain a substantial amount of free amine and solvent (usually water). The amine and water are moved in the vapor phase under thermal desorption, but can cause corrosion and other degradation in the attendant equipment. To address this concern, specialized, corrosion-equipment materials can be used for the equipment, but this can in turn increase capital costs for the plant. In some cases, corrosion inhibitors can be added, but the use of these specialized additives can also increase operational costs. Moreover, the oxidation of the MEA or hindered amine absorbents can acidify some of the solvents present. In addition to the corrosion problems which can result, this may decrease the available alkalinity for $CO_2$ capture, thereby reducing process efficiency.

Another example of a commercial $CO_2$ post-combustion capture process uses aqueous solutions of piperazine-promoted potassium carbonate ($K_2CO_3$). However, this process is often very energy-intensive, and can be economically inferior to the MEA process. Still another example involves the use of chilled ammonia. In this case, energy-intensive cooling systems are usually required for such a system, and the risks associated with unintended ammonia release may be unacceptable.

In view of these considerations, new methods for treating gas streams which contain $CO_2$ would be welcome in the art. The new processes should effectively remove some portion of $CO_2$ from the gas stream, under conditions which are economically viable in some industrial settings. Moreover, the processes should be compatible with related systems, e.g., power generation systems based on gasification, combustion, and the like.

BRIEF DESCRIPTION OF THE INVENTION

One embodiment of this invention is directed to a method for recovering carbon dioxide ($CO_2$) from a gas stream. The method comprises the following steps:

a) reacting $CO_2$ in the gas stream with fine droplets of a liquid absorbent, so as to form a solid material in which the $CO_2$ is bound;

b) transporting the solid material to a desorption site;

c) heating the solid material in the desorption site, to release substantially pure $CO_2$ gas; and d) collecting the $CO_2$ gas.

Another embodiment of the invention is directed to an apparatus for recovering carbon dioxide ($CO_2$) from a gas stream. The apparatus comprises:

(i) a reaction chamber suitable for reacting the $CO_2$ gas with a reactant; so as to form a solid material in which the $CO_2$ is bound;

(ii) a desorption site, for heating the solid material to release the $CO_2$ gas and to regenerate the reactant; and (iii) a transportation mechanism for transporting the solid material from the reaction chamber to the desorption site.

DETAILED DESCRIPTION OF THE INVENTION

Figure 1:
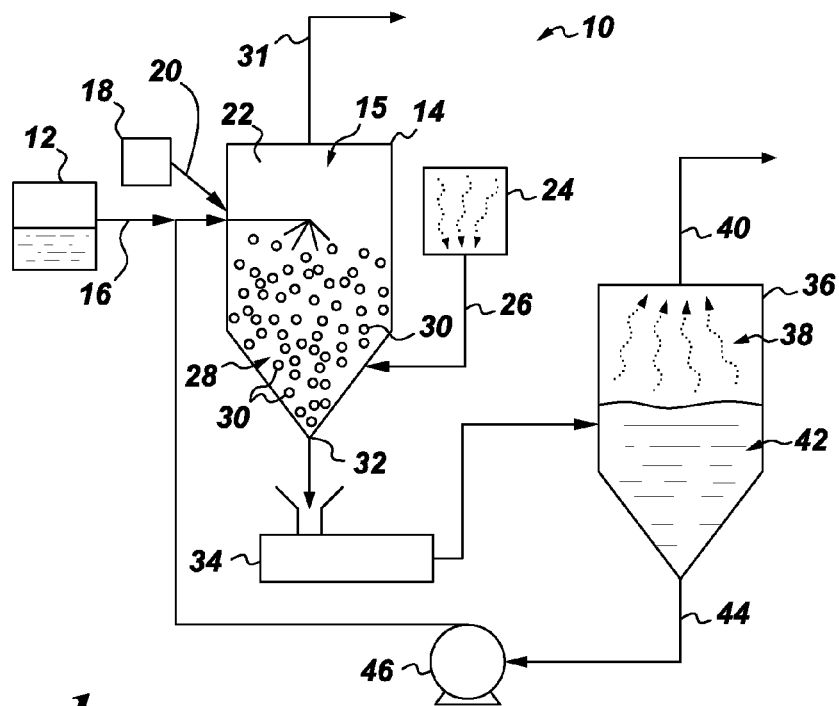
FIG. 1 is a schematic of an exemplary apparatus for recovering $CO_2$ from a gas stream.

The compositional ranges disclosed herein are inclusive and combinable (e.g., ranges of "up to about 25 wt %", or, more specifically, "about 5 wt % to about 20 wt %", are inclusive of the endpoints and all intermediate values of the ranges). Weight levels are provided on the basis of the weight of the entire composition, unless otherwise specified; and ratios are also provided on a weight basis. Moreover, the term "combination" is inclusive of blends, mixtures, alloys, reaction products, and the like. Furthermore, the terms "first," "second," and the like, herein do not denote any order, quantity, or importance, but rather are used to distinguish one element from another. The terms "a" and "an" herein do not denote a limitation of quantity, but rather denote the presence of at least one of the referenced items. The modifier "about" used in connection with a quantity is inclusive of the stated value, and has the meaning dictated by context, (e.g., includes the degree of error associated with measurement of the particular quantity). The suffix "(s)" as used herein is intended to include both the singular and the plural of the term that it modifies, thereby including one or more of that term (e.g., "the compound" may include one or more compounds, unless otherwise specified). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described inventive features may be combined in any suitable manner in the various embodiments.

As further described herein, carbon dioxide is present in a wide variety of gas streams which can be treated according to embodiments of this invention. Non-limiting examples include gas streams originating from a combustion process; a gasification process; a landfill; a furnace (e.g., blast furnace or chemical reduction furnace); a steam generator; a boiler; and combinations thereof. In some embodiments, the $CO_2$ gas stream is a flue stream originating in a coal-fired power plant. In other embodiments, the $CO_2$ gas stream originates in a coal gasification plant, exemplified by an integrated gasification combined cycle (IGCC) plant. In addition to $CO_2$, the flue stream can include a number of other constituents, such as oxygen, nitrogen, argon, carbon monoxide, nitrogen oxygen compounds, sulfur compounds (e.g., sulfur dioxide, carbonyl sulfide); soot particles, and water vapor.

A variety of liquid absorbents can be reacted with the carbon dioxide. In general, any liquid $CO_2$ absorbent that can be converted to a solid by reaction with carbon dioxide can be used to carry out the process described herein. Some of the liquid absorbents are described in the following references: "Reversible Gelation of Polyethyleneimide Solutions Using $CO_2$", Kitchens et al, AIChE Annual Meeting, San Francisco, Calif., 2006 (p. 520f of proceedings); and "Reversible, Room-Temperature Chiral Ionic Liquids. Amidinium Carbamates Derived From Amidines And Aliphatic Primary Amines With Carbon Dioxide", Yamada et al, Chem. Mater., 19, (5), 967-969 (2007).

Usually, the liquid absorbent comprises at least one amine material. Various amine compounds (the term as used herein includes polymeric materials as well) are suitable. Many fall into the following classes: aliphatic primary, secondary and tertiary amines, and polyamines; polyimines (e.g., polyalkyleneimines); cyclic amines, amidine compounds; hindered amines; amino-siloxane compounds; amino acids; and combinations thereof. Non-limiting examples of these materials are noted below.

Exemplary aliphatic amines and polyamines are cyclohexyl amine, ethylenediamine, diethylenetriamine, triethylenetetramine, tetraethylenepentamine, and the like. Moreover, materials such as substituted amines, for example alkanolamines, may also be used.

Exemplary polyimines are the polyalkyleneimines. Many of these materials are obtained by the polymerization of one or more alkyleneimines, such as ethyleneimine, propyleneimine, and 1,2-butyleneimine. In some embodiments, the preferred polyimine is polyethylenimine.

Illustrative cyclic amines include piperidine, piperazine and pyridine-based compounds such as 4-aminopyridine. Various bicyclo compounds can also be used, such as 1,5-diazabiciclo[4.3.0]non-5-ene (DBN) or 1,8-diazabiciclo[5.4.0]undec-7-ene (DBU).

A number of amidine and guanidine compounds may also be used. Most of amidines conform to the general structure

wherein each R group, individually, can be hydrogen or a lower alkyl group. Many of the amidine compounds are considered to be oxoacid derivatives. (When the parent oxoacid is a carboxylic acid, the resulting amidine is a carboxamidine). Some of the amidine compounds are described in U.S. Pat. No. 4,162,280 (Kranz) and U.S. Pat. No. 4,129,739 (Tracy et al). Each of these references is incorporated herein by reference. Non-limiting examples of the amidines include formamidine ($HC(=NH)NH_2$).

Guanidines are a group of organic compounds with the general structure $(R_1R_2N)(R_3R_4N)C=N-R_5$, wherein each "R" group can independently be hydrogen or an alkyl group. Non-limiting examples of the guanidines include 1,1,3,3-tetramethylguanidine (($Me_2)N)_2C=NH$).

Hindered amine compounds which may be used as the liquid absorbent are also known in the art. Some of these compounds are described in U.S. Pat. No. 4,405,579 (Sartori et al) and U.S. Pat. No. 6,117,995 (Zedda et al), as well as EP Application 0588175B1 (Yoshida et al). Each of these references is incorporated herein by reference. Non-limiting examples include polyalkyl-substituted piperidine derivatives, such as 2,2,6,6-tetramethyl piperidine. Other examples include 2,2,6,6-tetramethyl piperidine; tert-butylamine; cyclohexyldiamine; 2-(dimethylamino)-ethanol; 2-(diethylamino)-ethanol; 2-(ethylmethylamino)-ethanol; 1-(dimethylamino)-ethanol; 1-(diethylamino)-ethanol; 1-(ethylmethylamino)-ethanol; 2-(diisopropylamino)-ethanol; 1-(diethylamino)-2-propanol; 3-(diethylamino)-1-propanol; and combinations thereof.

Amino-siloxane compositions are also known in the art. Various types of these compounds are described in U.S. Pat. No. 5,939,574 (Schilling, Jr., et al) and U.S. Pat. No. 4,487,883 (Homan), which are incorporated herein by reference. Those skilled in the art will be able to determine which particular amino-silixoxanes are capable of reacting with gaseous $CO_2$ to form the solid material, as described herein. Some of the amino-siloxanes which are useful for this invention are described in a pending U.S. Patent Application for Perry et al; Ser. No. 12/512,105, filed on Jul. 30, 2009, which is incorporated herein by reference. A variety of amino-siloxanes are described in the referenced disclosure. Non-limiting examples of suitable amino-siloxanes include compositions which comprise chemical structure (I)

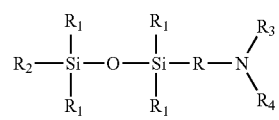

wherein R is a $C_1$-$C_6$ alkyl group, which can be linear or branched; and which can contain at least one hydroxy group; $R_1$ is independently at each occurrence $C_1$-$C_8$ alkyl or aryl; $R_2$ is $R_1$ or $RNR_3R_4$, wherein $R_3$ and $R_4$ are independently a bond, hydrogen, or $C_1$-$C_8$ alkyl (linear or branched).

One specific, illustrative example of an amino-siloxane compound is provided below as compound (Ia), wherein "Me" is a methyl group:

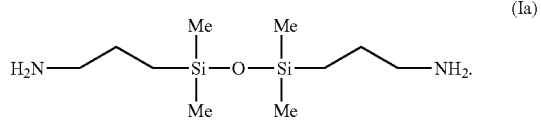 [SMILES: C[Si](C)(CCCN)O[Si](C)(C)CCCN]

The Perry et al Application describes methods for preparing various amino-siloxane compounds as well.

The identity of the solid material which is formed by reaction of the liquid absorbent with the $CO_2$ will depend in large part on the specific liquid absorbent that is used. In the case of amine absorbents, the solid material will depend on the identity of the amine. In many instances, the solid material comprises a carbamate or a bicarbonate compound, or a combination thereof.

The reaction of the liquid absorbent with the amine compound can be carried out in any large-scale chamber or enclosure. The particular type of chamber is not critical to this invention, as long as it allows for sufficient contact between the $CO_2$ and the liquid absorbent. Thus, the enclosure can be in the form of an absorption tower, a wetted wall tower, a spray tower, or a venturi scrubber, optionally equipped with an entrainment separator. Moreover, while a vertical chamber is depicted in the figures discussed below, a horizontally-oriented chamber might alternatively be used.

As an example, venturi scrubbers are known in the art, and typically include at least three sections: a converging section, a throat section, and a diverging section. An inlet gas stream can enter the converging section, and as the area decreases, gas velocity increases. Liquids are usually introduced at the throat, or at the entrance to the converging section. In a typical scenario, the inlet gas is forced to move at very high velocities in the small throat section, shearing the liquid matter from the vessel walls. This action can produce a large number of very tiny droplets, which can react with the inlet gas stream. As one non-limiting example, venturi systems are described in U.S. Pat. No. 5,279,646 (Schwab), which is incorporated herein by reference.

In some embodiments of this invention, the use of a spray tower is preferred. Spray towers and absorption towers are well-known in the art, and described in many references. Several illustrations include U.S. Pat. No. 7,368,602 (Sakai et al); U.S. Pat. No. 5,206,002 (Skelley et al); and U.S. Pat. No. 4,114,813 (Suga), all of which are incorporated herein by reference.

FIG. 1 is a simplified, non-limiting description of one apparatus 10 for carrying out the process according to embodiments of this invention. The liquid absorbent 12 is directed from any suitable source (not shown) into spray tower 14, via at least one conduit 16. The supply point for the absorbent is usually located in an upper region 15 of the spray tower 14, to ensure fine droplet formation of the absorbent, as described below, and to provide sufficient contact time with the $CO_2$. The supply point for the absorbent may be also located above or in the narrow (throat) part of a venturi scrubber. Absorbent atomizing means 18 is employed to disperse the absorbent into droplets.

A variety of conventional atomizing mechanisms may be used, such as spray atomization. For example, air or some another atomizing gas can be supplied from a nozzle tube 20 into the interior 22 of the tower 14. The atomizing mechanism would typically be located near the exit of conduit 16 into the tower, and more than one nozzle tube could be used as well. In some embodiments, many nozzles may be placed across the tower at different heights, to maximize the number of the absorbent droplets. Moreover, the atomizer 18 could in fact be incorporated into a portion of the conduit 16.

The selected size for the droplets of liquid absorbent will depend on various factors, such as the composition of the absorbent; the reactivity of the absorbent material with $CO_2$ gas; and the type and design of the absorption chamber. In general, the droplets should be small enough to collectively provide a maximum surface area for contact with the $CO_2$. In this manner, a relatively high proportion of the $CO_2$ can be removed from the gas stream. Moreover, the relatively small droplet size will help to ensure that the droplet particles are less prone to "stickiness", which could otherwise impede movement and suspension of the droplets. However, the droplets should be large enough to provide a sufficient mass for solid particle formation, as described below, and to prevent formed solid particles from being carried out of the tower. As a non-limiting example for an amine-based absorber used in a spray tower, the average diameter of the droplets is usually no greater than about 1000 microns, and typically, in the range of about 500 microns to about 1000 microns. In another embodiment when a venturi scrubber is used, the average diameter of the droplets is typically in the range of about 10 microns to about 100 microns.

With continued reference to FIG. 1, flue gas 24 is directed into spray tower 14 by any suitable conduit 26. In some embodiments (though not all), the flue gas is directed into a lower region 28 of the spray tower, relative to upper region 15. In this manner, an induced countercurrent flow exposes the outlet gas (described below) having the lowest $CO_2$ concentration to the freshest absorbent. At the same time, the inlet gas with the highest $CO_2$ concentration is exposed to the most "converted" absorbent. This type of flow scheme can permit the resulting solid particles to agglomerate more readily, leading to faster solidification.

The flow rate of the flue gas entering chamber 14 is maintained to provide the required residence time for the complete reaction, as described below. The inlet pressure depends on the design of the absorption chamber. The pressure drop for the flue gas entering the chamber may be relatively small in the case of a spray tower (e.g., about 1 inch (2.54 cm) of water), but may be larger for other types of absorption towers.

Contact between the $CO_2$ gas molecules and the liquid absorbent droplets results in the formation of solid particles 30, as mentioned previously. $CO_2$ is bound within the particles. The size, shape, and density of the particles depend on various factors, such as the size of the initial droplets; the content of the liquid absorbent; the residence time within the spray tower or other type of chamber; and the gas flow rate. The particles 30 should be small enough to solidify to at least a non-sticky surface texture, but large enough to provide a sufficient mass for effective transport out of the spray tower 14. Usually, particles 30 are spherical, or substantially spherical in shape. Their average density can vary significantly, but is usually in the range of about 1.1 g/cc to about 1.5 g/cc. The size of the particles can vary, e.g., depending on the initial spray technique used. In some instances, the average particle size is in the range of about 1000 microns to about 2000 microns.

Formation of solid particles 30 can remove a substantial amount of "free" $CO_2$ from the gas stream, e.g., at least about 50% by volume in some embodiments, and at least about 70% by volume, in other embodiments. The remaining, $CO_2$-lean flue gas can then be released as an outlet gas, via any suitable conduit 31. Alternatively, the lean flue gas can be directed to other locations for additional treatment or use.

The particles are then transported to a desorption site. Any means of transport is possible. Non-limiting examples include mechanical means; gas flow; pressure-facilitated means; or gravity flow, as described below. With reference to exemplary FIG. 1, solid particles 30 can exit spray tower 14 through any practical opening 32. The particles can then drop or be directed onto a transportation mechanism 34. Any suitable transportation mechanism can be employed, e.g., any type of belt, tube, conveyor, or other type of transportation line, that can also be equipped with one or more pumps. In some embodiments, a screw conveyor, e.g. an extruder screw, may effectively be used.

In other embodiments, the particles can be directed to a desorption site by pressure-means, e.g., with a carrier gas; or by way of a vacuum. Those skilled in the art of particle transport (e.g., resin powder or granules) are familiar with these types of systems. Furthermore, as yet another alternative, the desorption station 36 (described below) can be positioned below spray tower 14. In this manner, the solid particles 30 can simply drop into station 36 by gravity. In fact, the spray tower and the desorption unit could be sections of one overall structure.

Desorption station or chamber 36 can comprise any type of desorption unit used to separate volatile compounds from solid particles. In general, desorption station 36 is a vessel or tube which can provide varying heat and pressure conditions to liberate $CO_2$ from the solid particles 30. The station also includes a means for collecting the liberated gas, and separating the gas from any other desorption constituents, e.g., liquid or solid particles.

Desorption units are described in a number of references. One non-limiting example is the publication "Remediation Technology Health and Safety Hazards: Thermal Desorption", circulated by the Occupational Safety & Health Administration (OSHA); SHIB 02-03-03 (http://www.osha.gov/dts/shib/shib_02_03_03_tsds9.pdf), which is incorporated herein by reference. Many of the units are referred to as "thermal desorption units", which are designed to operate at relatively low temperatures, e.g., about 200° F. to 600° F. (93° C.-316° C.); or relatively high temperatures, e.g., about 600° F. to 1,000° F. (316° C.-538° C.).

In terms of applied temperature, thermal desorption units are often grouped into three process types: directly-heated units, indirectly-heated units; and in-situ units, as described in the OSHA reference. Moreover, the configuration of the unit can vary, e.g., depending on what type of solid material is being treated; and what temperature is required. In some instances, the desorption unit can be operated under a vacuum or very low pressure conditions; and/or low-oxygen conditions, to lower the heat requirements needed for desorption. Adjustment of the atmospheric conditions can also provide flexibility in reducing the likelihood of creating hazardous conditions, e.g., the formation of hazardous products, or flammable conditions.

In general, desorption of the solid particles 30 is typically carried out by heating the particles. As alluded to previously, the heat-treatment regimen will depend on the composition and size of the solid particles; the amount of $CO_2$ bound within the particles; pressure conditions within desorption chamber 36; and the required reaction rate. The temperature should be high enough to release as much $CO_2$ as possible from the solid particles, and is typically at least as high as the decomposition temperature of the particles. However, the temperature should not be excessively high, i.e., requiring excessive energy use; or possibly resulting in decomposition to byproducts which may be difficult to handle in the overall process. In most embodiments where the solid particles are carbamates, bicarbonates, or related compositions, the desorption temperature is usually in the range of about 80° C. to about 150° C. In some instances, the internal pressure in chamber 36 can be decreased, to accelerate the desorption process.

With continued reference to FIG. 1, the substantially pure $CO_2$ gas 38 is released or otherwise directed out of desorption chamber 36 by any suitable conduit 40 (or multiple conduits). In some instances, the $CO_2$ gas is compressed and/or purified, for re-use, or for transport to a location for sequestration. Various uses for the $CO_2$ gas are described in a number of references, e.g., U.S. Patent Application 2009/0202410 (Kawatra et al), which is incorporated herein by reference.

The desorption step also functions to regenerate a substantial amount of the liquid absorbent 42. In some embodiments, the liquid absorbent can be directed to treatment, storage, or disposal facilities. However, in preferred embodiments, liquid absorbent 42 is directed back to spray tower 14, through one or more conduits 44. One or more pumps 46 can be used to pump the absorbent back to the spray tower. However, other techniques for moving the absorbent through appropriate piping can be envisioned by those skilled in the art.

Typically, the regenerated liquid absorbent 42 can be added by itself to the spray tower, to react with additional $CO_2$ from a gas stream, forming more $CO_2$-bound solid material in a closed loop process. The regenerated liquid absorbent could be combined with "fresh" liquid absorbent 12, or could be added to the spray tower 14 as a separate feed, along with absorbent 12. Moreover, the liquid absorbent could be combined with one or more solvents, such as glycol ethers, e.g., glymes, triethyleneglycol dimethyl ether, or with water, to reduce the viscosity of the material which enters the spray chamber.

In some instances, the liquid absorbent used for reaction with $CO_2$ has a relatively high vapor pressure, and is volatile under typical atmospheric conditions. In other instances, small droplets of regenerated absorbents may be carried out of the desorption site with the gas flow. Therefore, it may be desirable to include at least one condensation step in the process. In this manner, additional absorbent may be recovered from the $CO_2$-lean flue gas, which results after decomposition of the solid $CO_2$-rich material.

Figure 2:
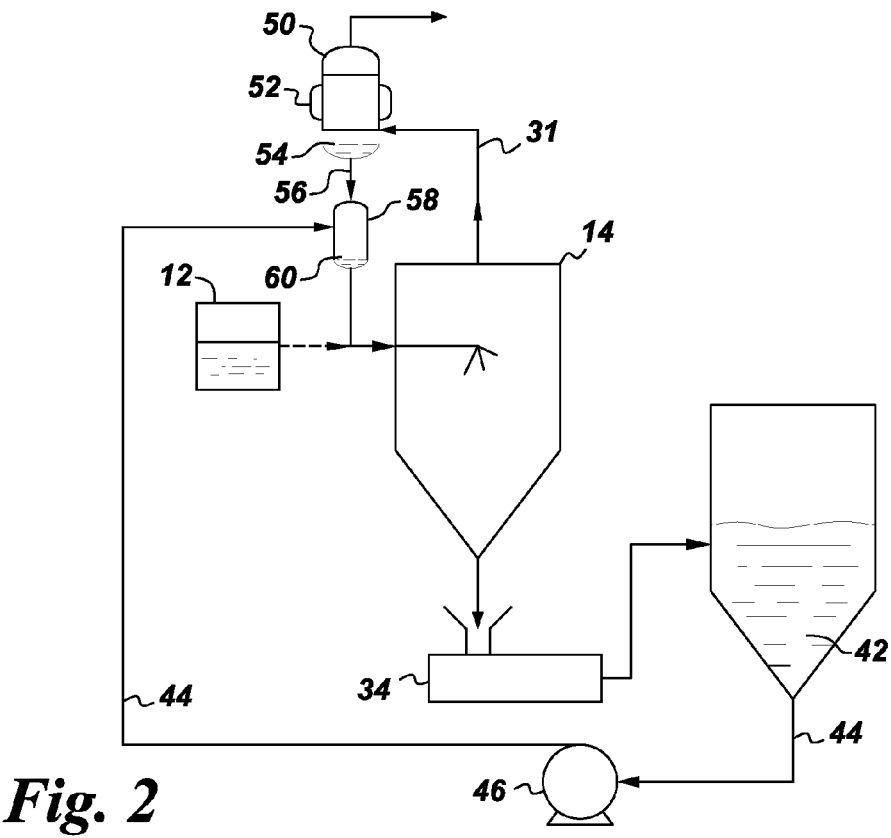
FIG. 2 is a schematic of another apparatus for recovering $CO_2$ from a gas stream.

FIG. 2 provides an illustration of these optional steps, and apparatus features which are identical to those of FIG. 1 need not be specifically described. Lean flue gas which may include some of the volatile absorbent is directed out of spray tower 14, through at least one conduit 31, to a condenser 50. The condenser may be outfitted with any type of conventional coolant system or device 52, e.g., cooling tubes or jackets which utilize a variety of coolant fluids, such as water.

Passage of the lean flue gas through the condenser serves to liquefy the residual coolant, while also coalescing any small liquid droplets. The regenerated absorbent 54 can then be directed through any suitable conduit 56 to a storage vessel 58. Absorbent 54 can be mixed with the regenerated absorbent 42, also being directed into storage vessel 58, via conduit 44. The combined, regenerated absorbent 60 can then be directed into spray tower 14, for additional reaction with $CO_2$.

There are alternatives to the general process outlined in FIG. 2. For example, storage vessel 58 may not be necessary, or may not need to accommodate both regenerated absorbents 54 and 42. In other words, one or both of the absorbent streams could be sent directly to spray tower 14.

Figure 3:
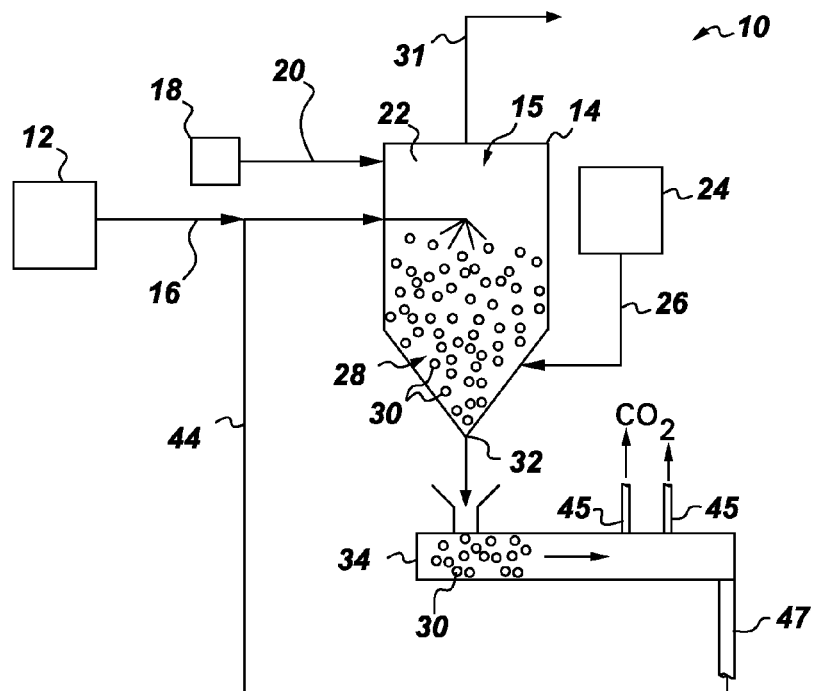
FIG. 3 is a schematic of another exemplary apparatus for recovering $CO_2$ from a gas stream.

Another alternative embodiment is depicted in FIG. 3, wherein a separate desorption unit is not necessary. In this instance, screw conveyor 34 may itself function as the desorption unit. For example, component 34 may be any type of an extruder, which would transport solid particles 30 through all or part of its length. As those skilled in the art understand, the solid particles can be directed through an extruder in many different ways. Non-limiting examples include mechanical means such as a ram; or other means, such as hydraulic pressure or a vacuum. In some instances, a single- or twin-screw auger is driven by an electric motor (or by a ram). Mechanisms for heating the solid particles in the extruder, i.e., to the desired desorption temperature, are also well-known in the art.

With continued reference to FIG. 3, heating of the particles 30 liberates carbon dioxide, which can be directed out of the extruder by any suitable outlets 45. The most appropriate shape, position, and number of outlets can be determined without undue experimentation. As in the other embodiments, the liberated $CO_2$ can be directed to any desired location.

The liquid absorbent which is regenerated after desorption in the extruder (or in any other type of suitable screw conveyor) can be collected and directed to a desired location. As an example, the absorbent could be directed by conduit 47 to supply conduit 16, for reentry into spray tower 14. Other alternatives for the regenerated material are possible, as noted above, e.g., pre-mixing with fresh absorbent, or direct transport to the spray tower. Moreover, this embodiment, like the others, can be combined with various other features disclosed herein. For example, this embodiment could employ the condenser system described above with respect to FIG. 2.

EXAMPLES

The example presented below is intended to be merely illustrative, and should not be construed to be any sort of limitation on the scope of the claimed invention.

Figure 4:
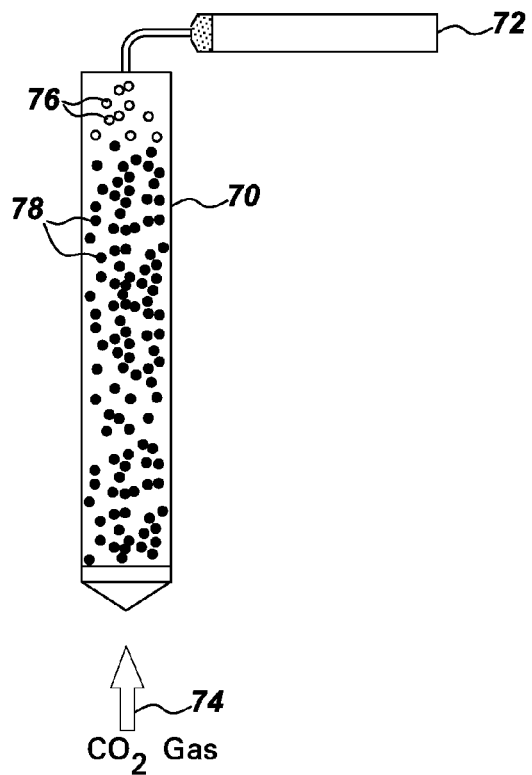
FIG. 4 is a schematic diagram of a test-apparatus for reacting $CO_2$ and a reagent.

A chromatography column made from fitted glass was used as the reaction chamber 70, depicted in FIG. 4. A syringe 72 with a bent needle tip was loaded with a $CO_2$-capture solvent (absorbent). In this instance, the solvent was an amino-siloxane compound referred to as "GAP-0", having the formula $(NH_2C_3H_6Si(Me)_2OSiMe_2C_3H_6NH_2)$, wherein "Me" is a methyl group. The GAP-0 absorbent was introduced as a fine liquid spray into a stream 74 of $CO_2$ gas flowing through the column. (Spray droplets 76 are illustrated for a general understanding of the process, but there is no intent to be specific about their size and exact position in the figure).

As the liquid absorbent contacted the droplets in the gas stream, white solid particles 78 readily formed. The solid particles fell to the bottom of the column, or partially stuck to the wall of the column, from where they were easily dislodged.

Analysis of the material of the solid particles 78 indicated a conversion of the GAP-0 to about 70-80% of the corresponding carbamate. Subsequent heating of the solid carbamate to about 120° C. for two to three minutes resulted in regeneration of the liquid absorbent material, with no apparent decomposition of the absorbent.

The present invention has been described in terms of some specific embodiments. They are intended for illustration only, and should not be construed as being limiting in any way. Thus, it should be understood that modifications can be made thereto, which are within the scope of the invention and the appended claims. Furthermore, all of the patents, patent applications, articles, and texts which are mentioned above are incorporated herein by reference.

What is claimed is:

1. A method for recovering carbon dioxide ($CO_2$) from a gas stream, comprising the following steps:
   a) reacting $CO_2$ in the gas stream with fine droplets of a liquid absorbent, so as to form a solid material in which the $CO_2$ is bound;
   b) transporting the solid material to a desorption site;
   c) heating the solid material in the desorption site, to release substantially pure $CO_2$ gas; and
   d) collecting the $CO_2$ gas.

2. The method of claim 1, wherein reaction of the $CO_2$ with the fine droplets occurs in a spray tower, or in a venturi scrubber.

3. The method of claim 1, wherein the fine droplets are formed by a spray atomization technique.

4. The method of claim 1, wherein the fine droplets have an average diameter no greater than about 1000 microns.

5. The method of claim 4, wherein the fine droplets have an average diameter in the range of about 500 microns to about 1000 microns.

6. The method of claim 1, wherein the solid material comprises solid particles, having a density of at least about 1.1 g/cc.

7. The method of claim 6, wherein the solid particles have an average particle size in the range of about 1000 microns to about 2000 microns.

8. The method of claim 1, wherein the liquid absorbent comprises at least one amine compound.

9. The method of claim 8, wherein the amine compound is selected from the group consisting of polyimines; polyamines; cyclic amines; guanidines; amidines; hindered amines; amino acids; amino-siloxane compounds, and combinations thereof.

10. The method of claim 9, wherein the polyimine comprises polyethyleneimine.

11. The method of claim 9, wherein the cyclic amine is selected from the group consisting of 4-aminopyridine; 1,5-diazabiciclo[4.3.0]non-5-ene (DBN); and 1,8-diazabiciclo[5.4.0]undec-7-ene (DBU).

12. The method of claim 9, wherein the amidine comprises formamidine ($HC(=NH)NH_2$).

13. The method of claim 9, wherein the hindered amine is selected from the group consisting of 2,2,6,6-tetramethyl piperidine; tert-butylamine; cyclohexyldiamine; 2-(dimethylamino)-ethanol; 2-(diethylamino)-ethanol; 2-(ethylmethylamino)-ethanol; 1-(dimethylamino)-ethanol; 1-(diethylamino)-ethanol; 1-(ethylmethylamino)-ethanol; 2-(diisopropylamino)-ethanol; 1-(diethylamino)-2-propanol; 3-(diethylamino)-1-propanol; and combinations thereof.

14. The method of claim 9, wherein the amino-siloxane compound is
$(NH_2C_3H_6Si(Me)_2OSiMe_2C_3H_6NH_2)$,
wherein "Me" is a methyl group.

15. The method of claim 9, wherein reaction between the liquid absorbent and the amine compound results in the formation of a carbamate, a bicarbonate, or combinations thereof.

16. The method of claim 1, wherein heating step (c) regenerates at least a portion of the liquid absorbent, which is separated from the collected $CO_2$ gas.

17. The method of claim 16, wherein heating step (c) is carried out in a chamber adapted to apply heat to the solid material in which the $CO_2$ is bound; or in an extruder.

18. The method of claim 16, wherein the regenerated liquid absorbent is directed back to a reaction site for reaction with additional $CO_2$ from the gas stream, to form additional solid material.

19. The method of claim 16, wherein the reaction site comprises a spray tower or a venturi scrubbing system.

20. The method of claim 18, wherein the regenerated liquid absorbent is directed back to the reaction site by a pumping means or pressure means.

21. The method of claim 1, wherein heating step (c) is carried out at a temperature sufficient to substantially decompose the solid material formed by the reaction of the $CO_2$ and the liquid absorbent.

22. The method of claim 1, wherein reaction step (a) forms $CO_2$-lean flue gas.

23. The method of claim 22, wherein the $CO_2$-lean flue gas contains volatile liquid absorbent, and the volatile liquid absorbent is condensed and directed back to a storage chamber, or to a reaction site for reaction with additional $CO_2$.

24. The method of claim 1, wherein the source of the gas stream is selected from the group consisting of a combustion process; a gasification process; a landfill; a furnace; a steam generator, a boiler, and combinations thereof.

25. The method of claim 24, wherein the source of the gas stream is a coal-fired power plant.

26. The method of claim 1, wherein the substantially pure $CO_2$ gas released in step (c) is sequestered in a separate location.

27. A method for recovering carbon dioxide ($CO_2$) from a gas stream which originates at a coal-fired power plant or a gasification plant, comprising the following steps:
A) reacting the $CO_2$ with fine droplets of a liquid absorbent in a spray tower or in a venturi scrubber, so as to form a solid material in which the $CO_2$ is bound;
B) transporting the solid material to a desorption chamber;
C) heating the solid material in the desorption chamber, to release substantially pure $CO_2$ gas; and to regenerate at least a portion of the liquid absorbent;
D) collecting the $CO_2$ gas; and
E) directing the regenerated liquid absorbent back to the spray tower or venturi scrubber.

* * * * *